(12) United States Patent
Burr

(10) Patent No.: US 8,060,013 B1
(45) Date of Patent: Nov. 15, 2011

(54) ESTABLISHING COMMUNICATIONS BETWEEN DEVICES WITHIN A MOBILE AD HOC NETWORK

(75) Inventor: Jeremy Burr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1662 days.

(21) Appl. No.: 09/930,779

(22) Filed: Aug. 15, 2001

(51) Int. Cl.
*H04B 7/00* (2006.01)
(52) U.S. Cl. ....... 455/41.2; 455/445; 455/507; 455/513; 455/514; 455/456.1; 455/456.3; 455/456.6; 370/338; 370/351; 370/400; 370/401; 370/408; 709/220; 709/221; 709/238; 709/239; 709/242
(58) Field of Classification Search .......... 455/418–420, 455/421, 422.1, 445, 507, 513–514, 517–519, 455/550.1, 552.1, 41.1–41.2, 456.1, 456.3, 455/456.6; 370/338, 351, 400–408, 478, 370/428–429; 709/220–221, 238–244
See application file for complete search history.

(56) References Cited

U.S. PATENT DOCUMENTS
5,412,654 A 5/1995 Perkins

FOREIGN PATENT DOCUMENTS
EP 0 561 129 A2 9/1993
WO WO 00/22860 4/2000

OTHER PUBLICATIONS

Kohda et al., *IMPP: A New Instant Messaging Standard and Its Impact on Internet Business*, Fujitsu-Scientific and Technical Journal, Kawasaki, Japan, vol. 36, No. 2, Dec. 2000, pp. 147-153.
Jeremy Burr, U.S. Appl. No. 09/948,270, filed Sep. 6, 2001, entitled "Establishing Communications Between Devices Within a Mobile Ad Hac Network Based on User Attributes".
Jeremy Burr, U.S. Appl. No. 09/948,300, filed Sep. 6, 2001, entitled "Controlling Communications Between Devices Within a Mobile and Ad Hoc Network".

*Primary Examiner* — Tuan A Tran
(74) *Attorney, Agent, or Firm* — Trop, Pruner & Hu, P.C.

(57) ABSTRACT

A mobile ad hoc network may be established between a plurality of devices that have common contacts on their contact lists. The contact lists may be conventional contacts stored in a list of contacts on a scheduling and information management or other software packages in one embodiment. Information about common contacts between a plurality of devices may be progressively shared, using a bucket brigade technique of sharing information between in-range devices. Status information about the devices in the network may be similarly shared in a bucket brigade fashion. Thus, the network is dynamic in the sense that at any given time, it may be determined whether any given device in the network is active. Moreover, the links are established between a manageable number of devices defined by having common contacts with one another.

30 Claims, 3 Drawing Sheets

ESTABLISHING COMMUNICATIONS BETWEEN DEVICES WITHIN A MOBILE AD HOC NETWORK

BACKGROUND

This invention relates generally to communication systems and particularly to establishing links between individuals on a wireless communication network.

A mobile ad hoc network (MANET) is an autonomous system of mobile routers and associated hosts connected by wireless links, the union of which forms an arbitrary graph. The routers are free to move randomly and organize themselves arbitrarily. Thus, the MANET wireless topology may change rapidly and unpredictably. Such a network may operate in a stand-alone fashion or may be connected to a larger Internet.

A MANET consists of mobile platforms called nodes that are free to move about arbitrarily. MANET nodes may be equipped with wireless transmitters and receivers using antennas which may be omnidirectional (broadcast), highly directional (point-to-point), steerable, or some combination thereof. Generally MANETs are bandwidth-constrained variable-capacity links. Often the nodes are energy-constrained since they may be portable and rely on battery power.

An implicit assumption within a MANET is that every node within the network may wish to communicate with every other node within the network. The MANET protocol defines all devices as routers, and then goes about trying to comprehend how each router maintains real time knowledge about the existence of other routers within the network. This becomes an exponential task to manage as the network increases in size. This problem is compounded by the ability of the nodes to dynamically enter or leave the network in an "ad hoc" fashion. The ad hoc nature of the network creates an onerous network management problem, flooding the network with status packages requiring constant updates.

There are a number of postulated causes for MANET network failure. The network updates may not be received fast enough to keep up with dynamic changes. The information about which nodes are currently connected to the network may become so out of date that it is no longer trustworthy. The network updates may consume so much of the available bandwidth that there may be insufficient residual bandwidth for actual data to traverse the network. The battery life of each node may be insufficient because of the volume of update traffic, which requires the node to be almost permanently communicating with other devices in order to obtain network status information. A routing table that contains the information about how to traverse from one node to another may become so large that it may not be stored in the available memory capacity of nodes within the network.

Thus, there is a need for better ways to manage a mobile ad hoc network.

DETAILED DESCRIPTION

Figure 1:
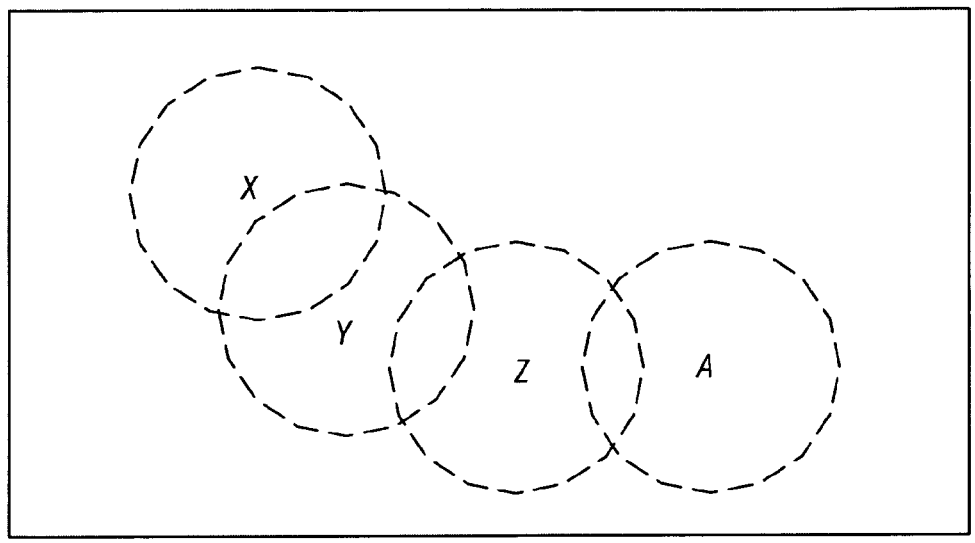
FIG. 1 is a schematic depiction of a mobile ad hoc network in accordance with one embodiment of the present invention.

Referring to FIG. 1, a mobile ad hoc network (MANET) may be established between a plurality of mobile devices, such as the devices X, Y, Z and A. Each device X, Y, Z and A may be a wireless transceiver. The wireless transceivers may use any available wireless protocol including the Bluetooth specification (Specification of the Bluetooth System, Version 1.1, Feb. 22, 2001) and 802.11 specification (IEEE Standard 802.11 available from the Institute of Electrical and Electronics Engineers, New York, N.Y.). In some embodiments they may be mobile battery powered devices. Each device generally has a limited range indicated by the dashed circles.

Instead of trying to communicate with every single device in the network, which commonly may be a very large number of devices, a network is established with a smaller group of devices within the network. Each device includes a contact list. A contact list is a list of individuals with whom the device has communicated in the past. Contact lists are commonly stored on computers. For example, on Microsoft Explorer®, contact lists may be maintained. Similarly, lists of addressees may be maintained with a variety of software including scheduling and information management software. Thus, each device X, Y, Z or A in this example, may have its own contact list.

In order to establish a network, each of the devices may exchange its contact list with any in-range devices. For example, the devices X and Y are both in-range and may exchange contact lists. Each device X or Y may then determine, in one embodiment, whether they may have common entries on their contact lists. This common entry information may be stored. Thereafter, the devices Y and Z may exchange contact lists and determine which devices are in common on each of their contact lists. In addition, the device Y may store information about which contacts on Z's contact list are also on X's contact list. The devices Z and A may then exchange contact lists and a determination may be made about what are their common contacts. Z may also determine which contacts on A's list are also on Y's list.

Thus, as shown in FIG. 1, the device X's contact list includes at least Y. The Y's contact list includes at least X and Z and Z's contact list includes at least Y and A. Finally, A's contact list includes at least Z.

In accordance with one embodiment of the present invention, a MANET is established within a smaller defined group, which is therefore much more manageable. The smaller defined group may be established by exchanging contact lists and establishing communication links from a first station, such as the station X with other stations which may or may not be in-range, but are determined to have common contacts in their contact lists. Thus, even though the device Z is out-of-range from the device X, the device X may establish a communication link through their common contact Y, to out-of-range device Z and ultimately to out-of-range device A.

Devices determine which common contacts they have and this common contact information may traverse the network as the network grows over time. This common contact information may be stored in a routing table, which in one embodiment may be available on each device within the MANET. Also, stored is information about whether or not a particular device is currently on-line.

In some embodiments, still additional profile information may be transferred and stored, such as the device's identifier, a profile of personal information about the device owner, alternative routes to each device on-line, and identifying adjacent devices for a first hop and the number of hops to the destination device. Also, stored in some embodiments, may be information about the type of each device, such as whether it is an audio, text, phone, still picture capable device, and the like.

This shared information may traverse across the network as well as being progressively exchanged between in-range devices. As status information changes, for example, whether or not a given device is on-line or not, that information may be shared around the network.

Figure 2:
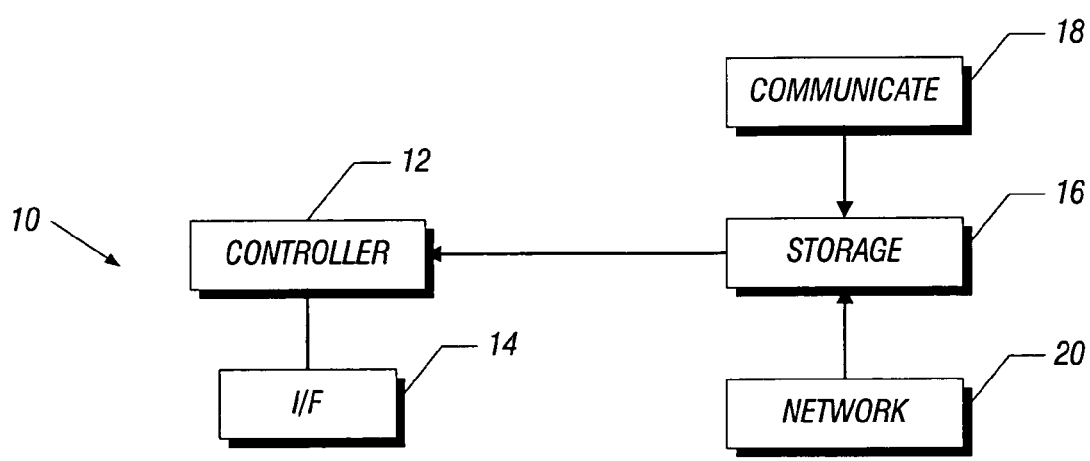
FIG. 2 is a block depiction of a node in a mobile ad hoc network in accordance with one embodiment of the present invention.

A device 10 such as one of the devices indicated as X, Y, Z or A in FIG. 1 may include a controller 12 as indicated in FIG. 2. The controller 12 may communicate with a wireless interface 14. It may also communicate with a storage device 16 that stores the communicate software 18 and the network software 20 in accordance with one embodiment.

Figure 3:
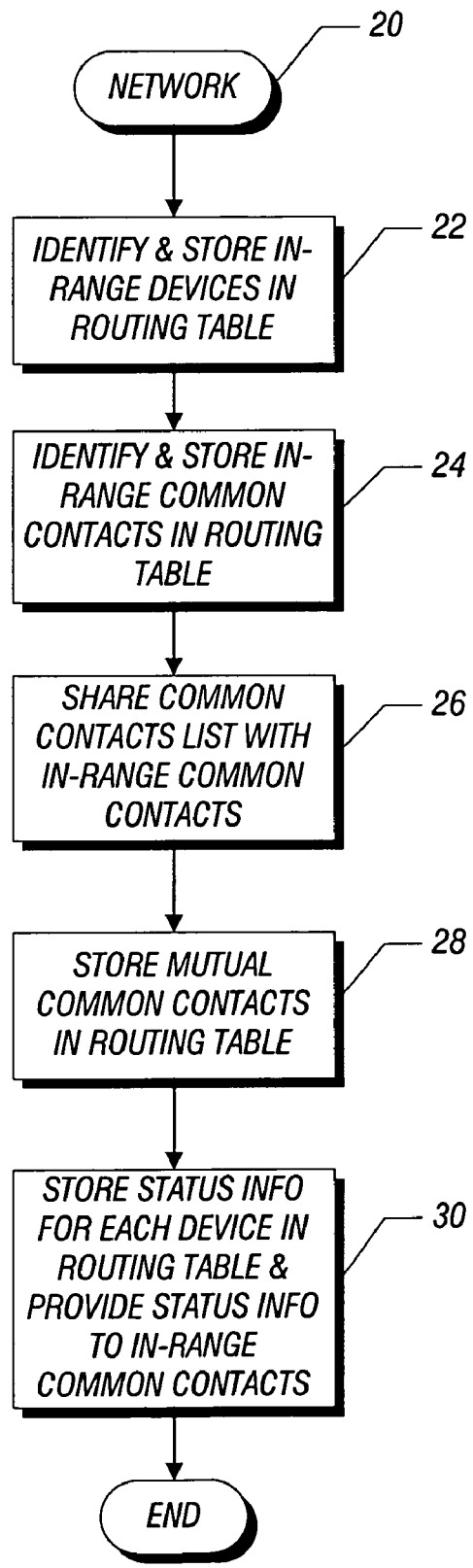
FIG. 3 is a flow chart for software in accordance with one embodiment of the present invention.

The network software 20 shown in FIG. 3, in one embodiment, begins by identifying and storing in-range devices as indicated in block 22. This in-range device information may be stored in a routing table stored in the storage 16 in one embodiment. Next, common contacts between in-range devices are determined. This may be done by exchanging common contact lists, identifying contacts that are common, and storing that information in the routing table as indicated in block 24.

The common contacts determined between a first set of devices may then be shared with other in-range devices that are common contacts as indicated in block 26. The mutual common contacts are then stored in the routing table.

Next, the mutual common contacts, whether they are in-range or not, are stored in the routing table as indicated in block 28. The out-of-range common contacts may be obtained by the progressive sharing throughout the network of information of common contacts between devices that are in-range. Eventually this information reaches out-of-range common contacts.

Finally, the status information for each device in the network of common contacts is stored. This status information may include whether a particular device is currently active or available for receiving communications and that information is similarly shared with in-range common contacts, eventually reaching out-of-range common contacts as indicated in block 30.

Thus, through the sharing of information between common contacts, the nature of the network and the status of each device in the network may be dynamically updated on an ongoing basis. As soon as one device is determined to no longer be active, that information may be gleaned by in-range devices that share the information with in-range devices until the information eventually progresses throughout the network. Because the common contacts determine a more workable number of devices, the MANET management becomes more workable. By establishing a MANET of manageable size using common contacts, a more efficient network may be achieved especially because of the likelihood that the common contacts will want to contact each other anyway. In other words, a MANET of manageable size is achieved among individuals who are likely to contact each other anyway, avoiding the storage of connection information between devices that are less likely to communicate with one another.

Figure 4:
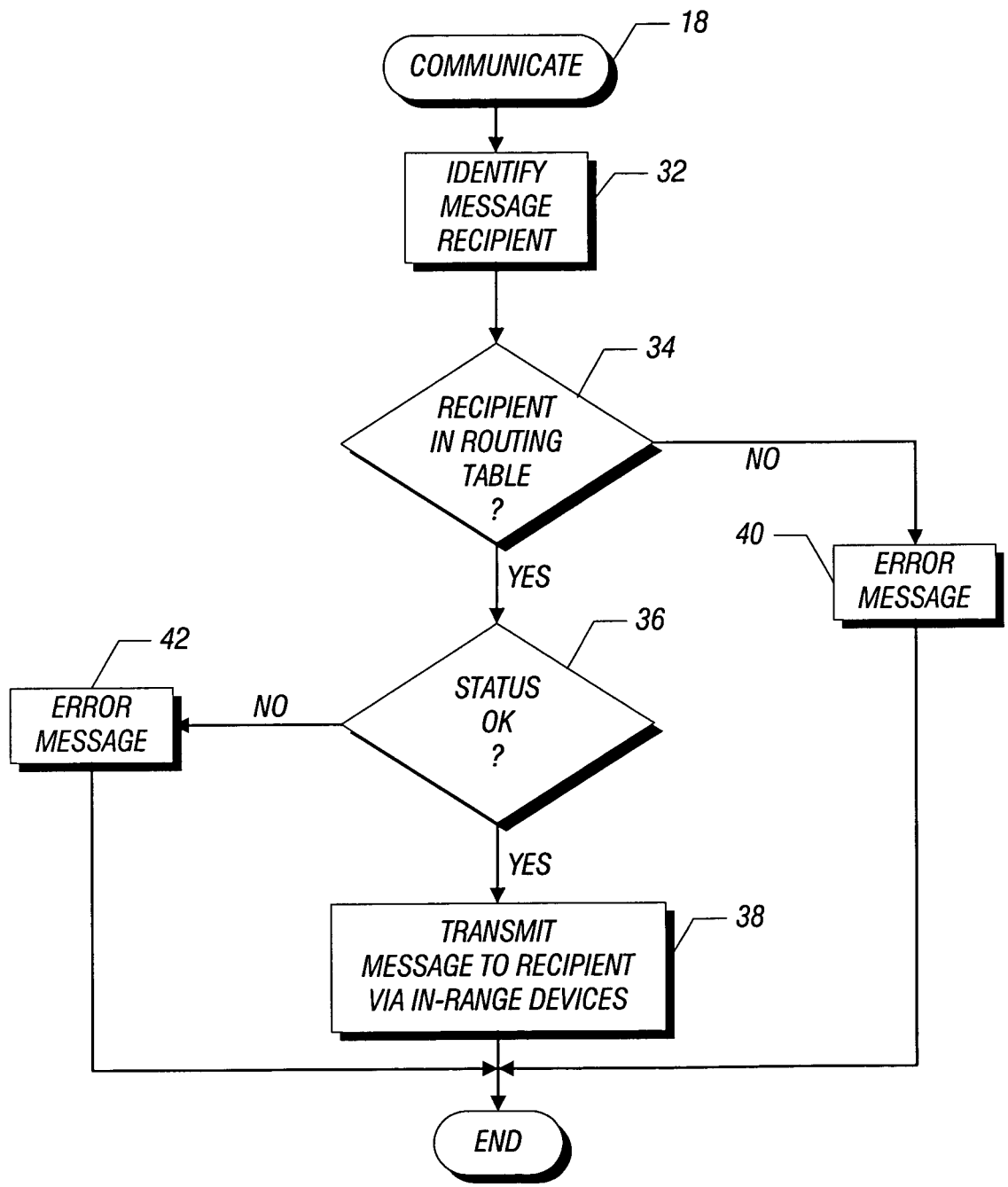
FIG. 4 is a flow chart in accordance with another embodiment of the present invention.

The communicate software 18, shown in FIG. 4, begins by identifying a recipient of a potential message as indicated in block 32 in one embodiment. A check at diamond 34 determines whether the intended recipient is in the routing table. If so, a check of the status information (diamond 36) associated with the intended recipient determines whether or not the device is currently active. If not, an error message may be generated as indicated in block 42.

If the device status is okay a message may be transmitted to the recipient via a series of in-range devices over a path that was stored in the routing table of those devices, as indicated in block 38. If an intended recipient is not on the routing table, an error message may be generated as indicated in block 40. This means that the device is both not in-range and not a common contact with a series of devices that can define a plurality of in-range links to that device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
obtaining, on a first wireless device, a contact list of second wireless devices with which the first wireless device has communicated in the past, including a first contact in-range from the first wireless device and a second contact being out-of-range from the first wireless device;
automatically establishing a communication route between the first wireless device and the first contact; and
automatically establishing a communication route from the first wireless device to a second contact through the first contact.

2. The method of claim 1 wherein obtaining the contact list includes acquiring information from a list of addressees on the first wireless device.

3. The method of claim 1 including automatically exchanging lists of contacts with in-range second wireless devices, comparing the lists of contacts, and identifying common contacts in said lists.

4. The method of claim 3 including exchanging lists of common contacts between two devices with other in-range devices.

5. The method of claim 1 including storing information sufficient to establish a communication route from said device to said second contact.

6. The method of claim 1 including storing information related to said first contact.

7. The method of claim 6 including storing information about whether said second contact is active.

8. The method of claim 7 including sharing information with other in-range devices about whether said first contact is active.

9. The method of claim 1 including periodically updating information about in-range devices.

10. The method of claim 1 including storing an alternative communication route to said second contact.

11. A non-transitory computer readable medium storing instructions that, if executed, enable a processor-based first wireless device to:
obtain a contact list of wireless devices which the first wireless device has communicated in the past, including a first contact in-range from the first wireless device and a second contact being out-of-range from the first wireless device;
automatically establish a communication route from the first wireless device to a first contact; and
automatically establish a communication route from the first wireless device to a second contact through the first contact.

12. The medium of claim 11 further storing instructions that enable the first wireless device to acquire information from a list of addressees on a device.

13. The medium of claim 11 further storing instructions that enable the first wireless device to automatically exchange lists of contacts with in-range devices, compare the lists of contacts, and identify common contacts in said lists.

14. The medium of claim 13 further storing instructions that enable the first wireless device to exchange lists of common contacts between two devices with other in-range devices.

15. The medium of claim 11 further storing instructions that enable the first wireless device to store information sufficient to establish a communication route from said device to said second contact.

16. The medium of claim 11 further storing instructions that enable the first wireless device to store information related to said first contact.

17. The medium of claim 11 further storing instructions that enable the first wireless device to store information about whether said second contact is active.

18. The medium of claim 17 further storing instructions that enable the first wireless device to share information with other in-range devices about whether said first contact is active.

19. The medium of claim 11 further storing instructions that enable the first wireless device to periodically update information about in-range devices.

20. The medium of claim 11 further storing instructions that enable the first wireless device to store an alternative communication route to said second contact.

21. A system comprising:
a processor;
a storage coupled to said processor storing instructions that enable the processor to:
obtain a contact list of contacts that the system has communicated with before, including a first contact in-range from the device and a second contact being out-of-range from the device;
automatically establish a communication route from the device to a first contact; and
automatically establish a communication route from the device to a second contact through the first contact.

22. The system of claim 21 wherein said storage stores instructions that enable the processor to acquire information from a list of addressees on a device.

23. The system of claim 21 wherein said storage stores instructions that enable the processor to automatically exchange of lists of contacts with in-range devices, compare the lists of contacts, and identify common contacts in said lists.

24. The system of claim 23 wherein said storage stores instructions that enable the processor to exchange lists of common contacts between two devices with other in-range devices.

25. The system of claim 21 wherein said storage stores instructions that enable the processor to store information sufficient to establish a communication route from said device to said second contact.

26. The system of claim 21 wherein said storage stores instructions that enable the processor to store information related to said first contact.

27. The system of claim 21 wherein said storage stores instructions that enable the processor to store information about whether said second contact is active.

28. The system of claim 27 wherein said storage stores instructions that enable the processor to share information with other in-range devices about whether said first contact is active.

29. The system of claim 21 wherein said storage stores instructions that enable the processor to periodically update information about in-range devices.

30. The system of claim 21 wherein said storage stores instructions that enable the processor to store an alternative communication route to said second contact.

* * * * *